United States Patent

[11] 3,550,984

[72] Inventor Douglas A. Moore
Rolling Hills, Calif.
[21] Appl. No. 658,839
[22] Filed Aug. 7, 1967
[45] Patented Dec. 29, 1970
[73] Assignee Northrop Corporation
Beverly Hills, Calif.
a corporation of California

[54] TAPE TRANSPORT MECHANISM

14 Claims, 10 Drawing Figs.

[52] U.S. Cl. 274/4, 179/100.2; 242/201
[51] Int. Cl. G11b 5/48, G11b 15/32; G03b 1/12
[50] Field of Search 242/55.12, 55.13, 55.14, 55.11, 67.4, 67.5, 71.2, 71.1, 201, 202, 203, 204, 206, 207, 208, 209, 210, 198, 199, 200; 352/78, 72; 274/4, 11; 179/100.2MI; 340/174.1G, 174.1H

[56] References Cited
UNITED STATES PATENTS

| | | | |
|---|---|---|---|
| 1,956,938 | 5/1934 | Wood et al. | 352/78 |
| 2,557,012 | 6/1951 | Shrader | (242/55.13DUX) |
| 3,032,286 | 5/1962 | Herrmann | 242/55.14 |
| 3,236,428 | 2/1966 | Yamane | 242/55.12(R) |

*Primary Examiner*—George F. Mautz
*Attorney*—Sokolski and Wohlgemuth

ABSTRACT: An improved tape transport mechanism wherein the tape is a continuous band connected between two takeup reels. The recorder or playback head is disposed adjacent the tape between the two reels with the tape having a plurality of channels located thereon. Means is provided for rotating the tape in both directions relative to the magnetic head with an automatic return to a center position when the drive means is released.

INVENTOR
DOUGLAS A. MOORE
BY
Sokolski & Wohlgemuth
ATTORNEY

INVENTOR.
DOUGLAS A. MOORE
BY
Sokolski & Wohlgemuth
ATTORNEYS

TAPE TRANSPORT MECHANISM

The herein invention is an improvement upon the tape transport mechanism described in U.S. Pat. No. 3,028,767, of Apr. 10, 1962, of the same inventor. The patent relates to a drive mechanism useful in driving takeup reels of any type of recording or reproducing apparatus when a pair of takeup reels must be independently driven. As mentioned in the patent, this type of apparatus can be installed in an aircraft where it functions to warn and instruct the pilot regarding emergencies and malfunctions which may occur. The device disclosed therein utilized two separate tape takeup reels independently and selectively. Each takeup reel received the tape from a corresponding rewind and supply reel. Thus in that patented device there were two separate systems including two separate pickup heads. As indicated therein, each tape had a plurality of messages thereon in the form of several channels. The motor to wind a given reel was programmed so as to drive the reel having the desired message, while the pickup head for the tape being directed to that reel was correspondingly programmed so that the selected channel would be activated. Spring means not shown in the patent was utilized to rewind the individual supply reels. The heart of the patented invention however related to the utilization of a novel drive mechanism for selectively driving either one of the two takeup reels.

The herein invention is an improvement over that disclosed in the referred to patent in that a more compact and lighter weight unit having a greater number of channels is provided by the design of the new device. This new improved device uses the novel drive mechanism in the previously referred to patent to drive the two reels utilized. However, the improvement relates to the particular construction of the two takeup reels so as to provide a bidirectional operation for the unit. Unlike the patented device, the herein invention has a continuous tape connected between the two takeup reels. Only one recorder head is thus required, disposed between the two reels and in contact with the tape. Through the bidirectional operation, there are two record channels on the tape for each of the magnetic head tracks. For example, if the tape head has 20 tracks the recorder will have 40 channels of recording. The starting point for all of the messages is the midway point of the tape. Pulling the tape to the left will provide 20 recorded channels in this example, while pulling the tape to the right provides 20 additional recorded channels.

As can thus be appreciated, each tape reel of this device is both a supply reel and a tape pulling reel. The individual reels are similarly constructed and have a power spring disposed within the main casing about which the tape is rotated. The power spring is coupled between the reel and the shaft on which the reel is disposed. The power spring can be to a given number of turns between the reel and the shaft by the use of stop washers which are also disposed within the reel housing and lock the shaft relative to the housing. The reel shaft itself is restricted in its number of turns by additional stop washers disposed on the shaft outside of the reel housing. The external stop washers serve to prevent relative rotation between the reel shaft and the main housing for the device in which the reel is disposed. To drive the tape the floating gear train described in the previous patent is rotated by its motor to engage the reel gear, causing rotation of the associated reel. The reel is free to rotate about its shaft until its external stops prevent rotation of the shaft. Normally, however, the message duration is less than the number of revolutions required for the stops to come into effect to prevent rotation. While the floating gear train is winding the tape, the other reel is obviously unwinding it. At the beginning of this sequence, the external stops on the second or unwinding reel are in a position to prevent rotation between the shaft and the housing for the device. However, the spring mounted within the reel and the internal stops therein allow movement or rotation of that reel, forcing the spring into compression. The number of revolutions the unwind reel makes is determined by the internal stops, which may correspond to the number of stops mounted externally on the winding reel. At the end of the message, a means such as a photoelectric cell or tape sensor stops and momentarily reverses the motor which releases the floating gear train from engagement with the reeling gear. At this moment the spring in the unreeling gear unwinds and rapidly rewinds the mechanism to the tape starting position. Once again the external stops on this reel will prevent its unwinding past the midpoint of the tape. As can be seen, this provides for an expeditious and rapid means for returning the tape to a midpoint position automatically upon disengagement of the gear train with the takeup reels.

It is believed that the invention will be better understood and further features adequately explained in the following detailed drawings in which.

Figures 3, 3A, 4, 4A, 5, 5A, 7:
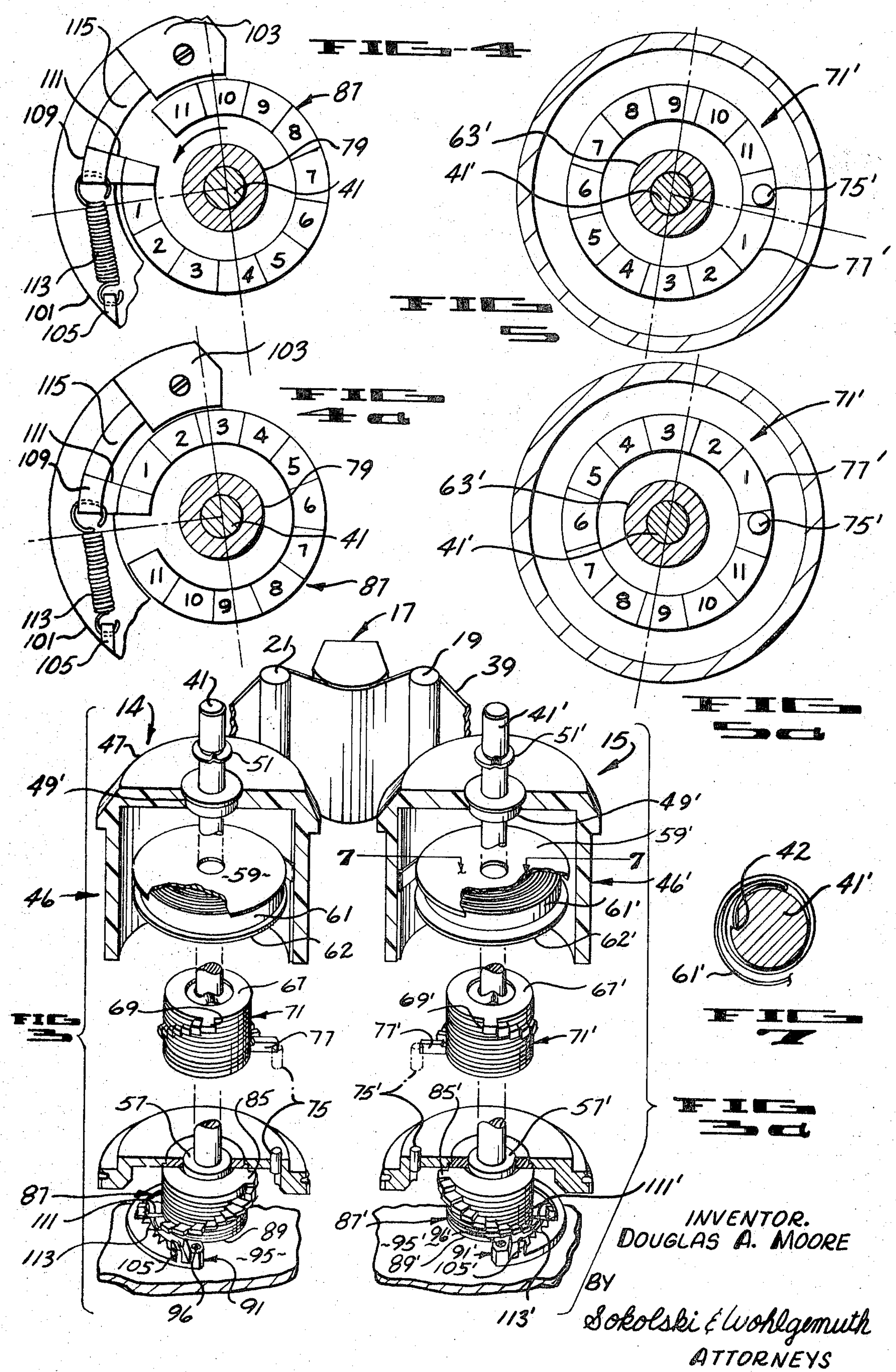
FIG. 3 is an exploded perspective view of the left reel of the invention.

FIG. 3*a* is an exploded view of the right reel of the invention.

FIG. 4 is a schematic representation of the external stops on the exposed portion of the shaft at the left reel prior to its winding the tape in a counterclockwise direction.

FIG. 4*a* is a schematic representation of the stops as shown in FIG. 4 after the reel has been completely wound.

FIG. 5 is a schematic representation of the relationship of the internal stops in the right reel prior to it unwinding and feeding the tape to the left reel.

FIG. 5*a* is a depiction of the stops of FIG. 5 after the right reel has completely unwound the message of the tape wound on it.

Figure 2:
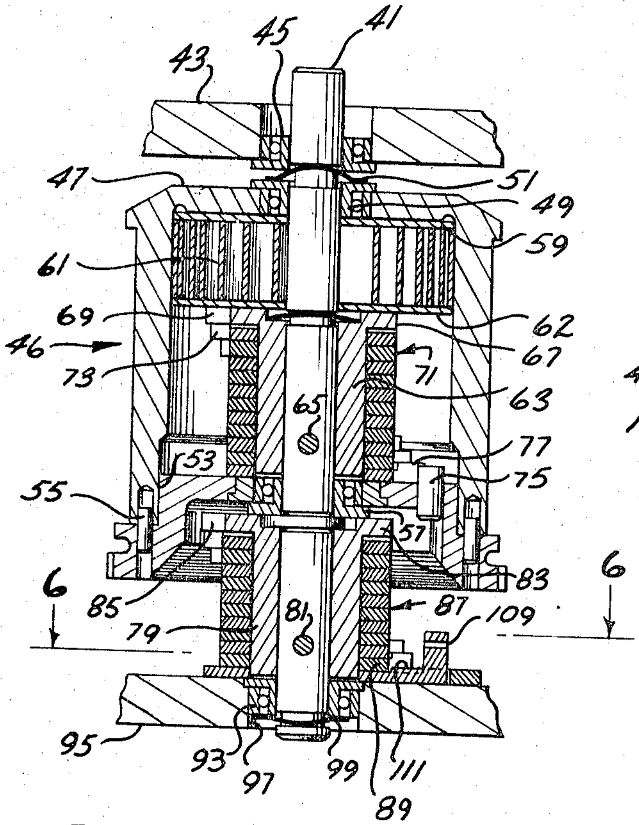
FIG. 2 is a sectional view of one of the two takeup reels utilized.
Figure 6:
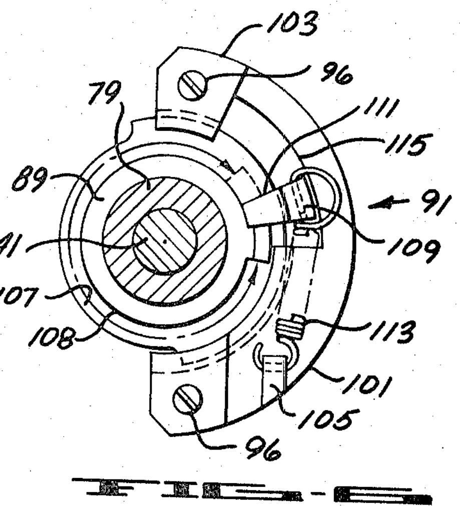

FIG. 6 is a sectional view of the stop cam for the right reel taken along line 6–6 of FIG. 2.

FIG. 7 shows the connection of the rewind spring to the reel shaft.

Figure 1:
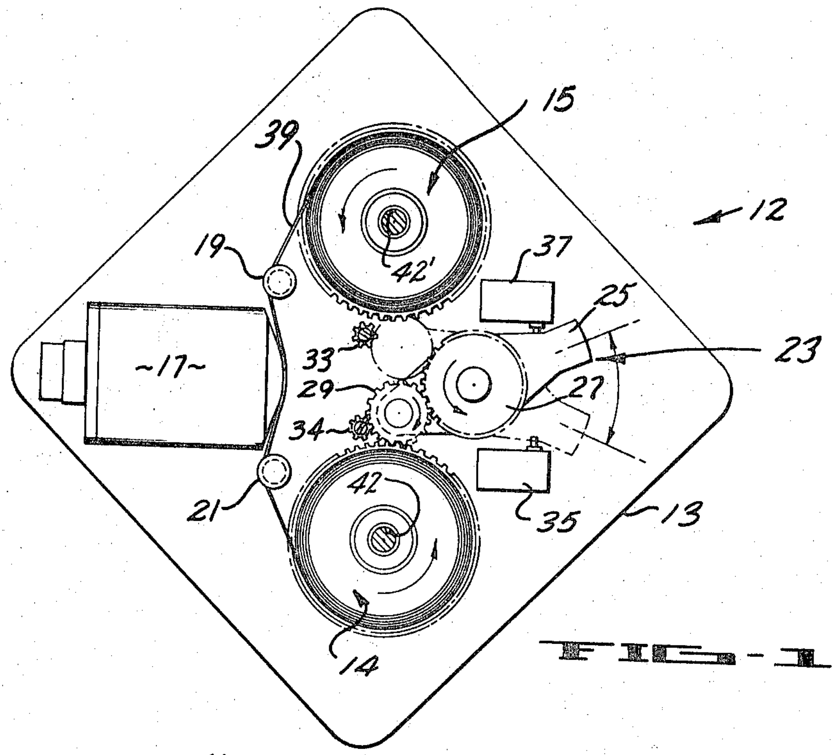
FIG. 1 is a partially sectioned top view of the audio reproducing apparatus of this invention utilizing the improved reels.

Turning now to FIG. 1, there is shown the device 12 of the invention. It includes a frame 13 in which the reels 14 and 15 are mounted. The particular construction of the two reels forms the main improvement of this device over that of the previous patent. Additionally mounted on the frame is a single magnetic head assembly 17 and a pair of tape guide rollers 19 and 21. The mechanism is driven by a drive mechanism 23 which is identical to that in the previously disclosed patent and operates in exactly the same manner as that previously disclosed. The drive mechanism 23 includes a yoke member 25 of bifurcated construction. The drive mechanism includes as indicated in the previous patent a drive gear 27 and idler gear 29. The herein device additionally includes the clutch assemblies 33 and 34 whose function is adequately disclosed in the patent. A motor (not shown) is utilized to drive the mechanism in a manner previously described. Microswitches 35 and 37 are provided to enable return of the drive mechanism 23 to a neutral position enabling the tape to return to its starting position, as will be described. The function of the microswitches has been thoroughly explained in the foregoing patent and forms no part of the herein invention.

The magnetic recording tape 39 forms a continuous band between the reels 14 and 15. A plurality of messages are recorded on the tape in each direction from an initial starting center point, plus as the tape is wound on left reel 14, for example, one of a plurality of messages on the portion of the tape wound on reel 15 will pass over the recorder head 17 and be picked up, while alternatively the same process will be repeated when the tape is wound about right reel 15 starting from an initial center position. The reels, as indicated, are selectively driven by the drive mechanism 23 previously patented. The purpose of this invention is to provide a means whereby the tape will be automatically, rapidly and accurately returned to a dead center starting position upon disengagement of the drive mechanism 23 with the reel that is being driven. This will enable a playback of a message when the tape is being wound about reel 14 rapidly followed by another message recorded on the opposite side of the tape, requiring the tape to be then wound about reel 15 in an opposite direction. In order to play such messages one after another it is imperative that the tape be returned immediately to the center position relative to head 17 so that a second, third or additional messages can be played regardless of the side of the tape on which they are located. The electronic system used to operate the device so as to selectively drive the reels through the drive mechanism 23 is the same as that in the patented item and is thus incorporated herein by reference, since it is believed lengthy discussion is not warranted. The remaining discussion will be directed mostly to a description of the construction of the reels 14 and 15 so as to achieve the desired rapid rewind capability.

Turning now to FIGS. 2 and 3, it can be seen that the reel 14 has a shaft 41 which passes through the top support plate 43 of the overall device wherein it is surrounded by bearings 45. The main body of the reel is comprised of a cylindrical housing 46 which is open at the bottom and has a flat top portion 47 surrounding the shaft. Between the portion 47 and the shaft is disposed a bearing 49. A bearing preload spring 51 is disposed between bearings 45 and 49. A bottom plate 53 serves to enclose the housing 46. Plate 53 is secured to the walls of the housing 46 by pins 55. Bearings 57 surround the shaft 41 where it passes through the bottom plate 53. Within the reel housing 46 adjacent the top surface 47 is a first disc 59 surrounding the shaft 41. Mounted below and immediately adjacent the disc 59 is a power spring 61 having its inner end affixed to the shaft 41 in a slot 42, while the outer end of the spring is disposed in a slot in the housing 46 of the reel. Immediately below the power spring is a second disc 62. The two discs thus serve to form a compartment for the power spring. Below disc 62 is a stop bushing 63 secured to shaft 41 by a pin 65. The bushing 63 has a lip 67 at its top surface with a stop extension 69 affixed thereto. A plurality of stop washers 71 surround the bushing 63 with the uppermost washer 73 capable of engagement with the stop 69 on the bushing 63. Each stop washer 71 picks up the next stop washer with each turn of the reel housing 46. A stop pin 75 extends upwardly from the bottom 53 of the reel and engages the last stop washer 77. Thus, as the reel turns relative to a fixed shaft 41, the last stop washer 77 is picked up by the pin 75. Each stop washer 71 picks up the next stop washer with each turn of the reel until the final washer 73 at the top engages the stop 69 on the lip 67 of the bushing which is not rotating since it is affixed to the shaft. This will thus prevent rotation of the reel. As can be appreciated, however, when the shaft 41 is free to rotate so that bushing 63 will turn accordingly, then the stop 71 on the bushing will not come into play to prevent rotation since neither the pin 75 nor the stop 69 on the lip of the bushing are in a fixed position. The stop washers thus will only be effective where the shaft 41 is in a position where it is prevented from rotating.

Disposed below and external of the bottom plate 53 of reel 46 is a second stop bushing 79 secured to the shaft 41 by pin 81. This stop bushing 79 is identical to the first stop bushing 63 located within the reel and has an upper lip 83 with a stop 85 affixed thereto. A plurality of stop washers 87 surround the bushing 79. The bottom washer 89 picks up the rewind stop cam 91 which is coupled to the housing in a manner which will be further described. A flanged bearing 93 is disposed between the bottom of the bushing 79 and the base 95 of the entire device. Bearing 97 surrounds the shaft 41 where it passes through the base 95 and is held in place by a clip fastener 99.

The stop cam 91 as seen in FIGS. 3 and 6 comprises a circular section 101 which is rigidly affixed to the base 95 of the housing by screws 96. Raised portions 103 and 105 are provided at each end of the section. A slidable disc 107 has an inner diameter 108 equivalent to the outer diameter of the lower bushing 79 so that the disc 107 surrounds the bottom stop washer 89. As can be seen, the disc 107 additionally seats underneath and within the circular section 101. The disc 107 has a stop pin 109 extending upwardly therefrom affixed to its circumference and with a raised portion 111 on the surface of the disc adjacent to stop pin. The raised portion 111 is such that it will engage the stop 83 when in contact therewith. A stop spring 113 connects the stop pin 109 to the portion 105 of the circular section 101. As can be seen, the stop pin 109 can travel within the section 101 in the groove 115 from where the spring is shown in FIG. 3 in its point of minimum compression to its possible greatest expansion adjacent the portion 103. As particularly seen in FIGS. 3 and 6, in a quiescent position when the tape is in its dead center, the bottom stop 89 is disposed between the stop pin 109 and raised portion 105 to which the spring is connected. The same mechanism is present of course for the right reel 15, as seen in FIG. 3*a*, with its bottom stop also in the same location when the tape is in its dead center position.

To explain the operation of the device, reference is now had to FIGS. 4 and 4*a* which serve to schematically depict the bottom stops relative to the stop pin of the left reel 14. A bottom stop 89 has been given a number 1 so as to facilitate this explanation, since the stops are thus numbered consecutively in the FIG. As shown, 10 stops completely encircle the device with the 11th stop representing the stop on the bushing 83. Stop 11 thus is equivalent to the stop 85 on the bushing as shown in FIGS. 2 and 3. In most instances, only 7 or 8 stops are required. However, it can be appreciated that as many stops as are needed can be added by merely decreasing the width of each stop.

In actual operation of the device, when the left reel is driven counterclockwise as shown in FIG. 1 and by the direction of the arrows in FIGS. 4 and 4*a*, the shaft 41 is accordingly rotated counterclockwise. To fully understand what is occurring, it must be pointed out that the spring 61 as seen in FIGS. 1 and 2 in the left reel is wound so that its normal tendency is to force the left reel in a counterclockwise direction when it is wound up. The spring 61 is normally preloaded when placed in the reel with approximately four or five turns so that its normal tendency is to force the reel in such a counterclockwise direction in relation to shaft 41. Likewise, in the right reel the normal tendency of the coiled spring therein is to force that reel in a clockwise direction in relation to the shaft 41. Thus, as shown in FIG. 3, the pin 75 affixed to the reel housing is tending to push against the bottom stop 77 therein, forcing the stops in a counterclockwise direction so that the top stop 69 affixed to the bushing 63, which in turn is locked to the shaft 41, tends to lock the shaft relative to the reel. As the reel is continued to turn counterclockwise by the motor gear train, the bottom stop 77 is forced counterclockwise due to the force of pin 75 connected to the reel. In turn, the top stop 69 on the bushing is also forced counterclockwise thus forcing the shaft 41 to rotate counterclockwise. Thus, as the shaft 41 rotates counterclockwise the rotation of shaft 41 will in turn force rotation of the lower bushing 79 and the attendant stop 11 shown in the schematic of FIG. 4 to move in a counterclockwise direction. After one revolution, stop 11 will pick up stop 10 and move stop 10 counterclockwise. This process is repeated until all the stops have rotated from the position shown in FIG. 4 to that shown in FIG. 4*a*. The net result of this is that stop 1 is prevented from further rotation in a counterclockwise direction once it strikes the raised portion 111 forcing it to rotate to its limit in the counterclockwise position. As soon as this occurs, the shaft 41 is thus locked relative to the base 95 of the device and cannot move further.

While the aforegoing is occurring in the left reel, attention is directed to FIGS. 5 and 5*a* to explain what is occurring in the right reel, which is rotating also counterclockwise. As the right reel, seen in FIG. 3*a*, starts to unwind the tape therefrom, the external stop washers of the reel 15 push against its cam stop 111′ forcing the stop spring 113′ into an expansion position. As soon as the spring reaches its maximum expansion, the shaft of the reel 15 is locked relative to the housing due to the action of the external stops preventing further rotation between the shaft and the housing. The spring 61′ within the reel then picks up the rotation and starts to wind. As this occurs, the pin 75′ located in the reel moves together with the reel counterclockwise from its initial position shown in FIGS. 5 and 3a to pick up the bottom-most stop washer, designated again as Number 1, as shown in FIG. 5a. At the completion of a second revolution, the pin 75′ together with stop 1 will pick up the second stop washer, designated as Number 2, and so forth until all the stop washers are picked up. Since the top stop washer 11 is affixed to the shaft 41′ due to the pin and the bushing 63′, to which the stop is attached, the housing of the reel is prevented from further rotation relative to the shaft 41′. This thus locks the reel and prevents further rotation in winding of the spring. As soon as the gear mechanism is released upon completion of the message, the spring in the right reel unwinds it rapidly, forcing it to move in a clockwise direction. This of course rewinds the tape on the reel. The left reel, or course, is additionally moving in a clockwise direction at the time of rewind. The shaft 41 of the left reel is rotating due to the fact that the spring therein locks the reel housing to the shaft so that both will rotate together. As the shaft 41 rotates in a now clockwise direction, the top stop 11 on the external bushing 79 rotates additionally in a clockwise direction picking up successive stops. This in turn will cause the bottom stop 1 to return to the position shown in FIG. 4, and in fact is actually stopped by striking the base portion 111, forcing the spring 113 into expansion thereby cushioning the effect.

As the tape reaches its starting point, the reels have stored kinetic energy. Since the reels are now rotating in a clockwise direction, the left reel shaft 41 returns to its starting point as indicated as stopped by the rewind stop cam, thereby picking up its power spring 61 which resists the overshoot. Also, the right reel 15 picks up its shaft and stop washers which tends to absorb some of the energy. When the kinetic energy is absorbed by the left power spring 61, the mechanism is then returned by the left power spring and this continues until the total kinetic energy is absorbed which is usually two overshoots. Thus the two power springs in each of the reels provide high speed rewind and then absorb the energy without overstressing the mechanical stops and the tape.

Though the invention has been described with regard to the floating gear train mechanism described in the previous patent, it should be obvious that other clutching mechanisms could be used to couple and decouple a drive motor from the reels 14 and 15. The high speed rewind capability of the reels utilizing the continuous tape can obviously be applied to other systems.

It can be readily be seen that the construction of the reels and arrangement of the stop washers is such that the phenomena which occurs driving the left reel 14 as particularly described for illustrative purposes, applies exactly when right reel 15 is being driven by the motor in a clockwise direction causing the tape to unwind from reel 14 which likewise would be then moving in a clockwise direction.

While the device of the invention has been described and illustrated in detail, it is to be clearly understood that this is intended for the purposes of illustration and example only and is not to be taken by way of limitation, the spirit and scope of this invention being limited only by the terms of the following claims.

I claim:

1. In a magnetic tape device having two takeup reels, a magnetic recording tape connected between said reels and means for selectively driving each of said reels so as to move said tape bidirectionally past a magnetic head assembly, means for effecting a rapid rewind of said reels comprising:

spring means in each reel for effecting an automatic rewind when means driving the opposite reel disengages therewith; and means for limiting the revolutions each reel can make upon rewinding.

2. The device of claim 1 additionally comprising means for limiting the revolutions each reel can make when being driven.

3. The device of claim 1 additionally comprising means for absorbing kinetic energy when the driven reel is disengaged and rapidly unwinds.

4. The device of claim 1 wherein each reel comprises:

a rotatable shaft;

a cylindrical reel housing mounted on said shaft;

a coiled power spring within said reel housing connected between said reel housing and said shaft; and stop means within said reel housing for limiting the number of revolutions said housing can make when said spring is forced to wind.

5. The device of claim 4 additionally comprising stop means mounted on said shaft external of said housing for limiting the number of revolutions said reel can make when it is being driven.

6. The device of claim 5 wherein said external stop means additionally has means for limiting the number of revolutions said reel can make when unwinding tape therefrom.

7. A bidirectional magnetic tape device utilizing a single tape comprising:

two takeup reels;

a magnetic head assembly disposed medially between said reels;

means for selecting driving each of said reels whereby said tape will pass over said head bidirectionally from an initial starting point; and means in each reel for effecting an automatic rewind thereof when said drive means disengages the opposite reel after said drive means has forced said opposite reel to wind tape thereabout.

8. The device of claim 7 wherein said rewind means includes means for returning said reels to the said starting position after each engagement with said drive means.

9. The device of claim 8 wherein said rewind means comprises a power spring affixed to each reel, said spring being forced to wind when the opposite reel is being driven.

10. The device of claim 9 including means for preventing said spring from winding when its associated reel is being driven by said drive means.

11. The device of claim 9 additionally comprising means for limiting the number of revolutions said reels can make in both winding and unwinding conditions.

12. The device of claim 7 wherein each reel is comprised of:

a rotatable shaft;

a cylindrical reel housing mounted on a portion of said shaft whereby the magnetic tape can be wound thereabout;

a coiled power spring within said reel housing connected between said reel housing and said shaft;

stop means within said reel housing limiting the number of revolutions said housing can make when said spring is forced to wind; and stop means mounted on said shaft external of said housing for limiting the number of revolutions said reel can make when it is driven, said means acting to lock the rotation of said shaft relative to the housing for the entire device.

13. A reel for use in magnetic tape devices comprising:

a shaft;

a cylindrical reel housing mounted on a portion of said shaft whereby the magnetic tape can be wound thereabout;

a coiled power spring within said reel housing connected between said reel housing and said shaft;

stop means within said reel housing limiting the number of revolutions said housing can make when said spring is forced to wind; and stop means mounted on said shaft external of said housing for limiting the number of revolutions said reel can make when it is driven, said means acting to lock the rotation of said shaft relative to the housing for the entire device.

14. A method of bidirectional recording and playback of a magnetic tape device comprising;

affixing a magnetic tape between two takeup reels;

disposing a magnetic head assembly adjacent said tape between said reels in an initial starting position, said starting position being intermediate the length of said tape;

selectively forcing the tape to wind on a chosen reel thereby moving it past said head;

rewinding said wound tape to said starting position; and causing a given track on said head to selectively record or playback two different messages depending upon the direction of movement of tape past said head from said initial starting position.